United States Patent
Cox et al.

(10) Patent No.: US 7,870,684 B2
(45) Date of Patent: Jan. 18, 2011

(54) METHOD AND SYSTEM FOR OPTIMISING LAND LEVELLING DESIGNS

(75) Inventors: David Cox, Ayr (AU); Graeme Cox, Molendinar (AU)

(73) Assignee: Davco Farming, Molendinar, Queensland (AU)

( * ) Notice: Subject to any disclaimer, the term of this patent is extended or adjusted under 35 U.S.C. 154(b) by 0 days.

(21) Appl. No.: 12/194,942

(22) Filed: Aug. 20, 2008

(65) Prior Publication Data

US 2009/0071667 A1    Mar. 19, 2009

(30) Foreign Application Priority Data

Aug. 20, 2007    (AU) .............................. 2007904470

(51) Int. Cl.
    *E02F 5/02*    (2006.01)
(52) U.S. Cl. .......................................... 37/348; 701/50
(58) Field of Classification Search ............... 172/2–11; 37/348; 701/50, 207, 209; 342/357.01, 357.17
    See application file for complete search history.

(56) References Cited

U.S. PATENT DOCUMENTS

| | | | | |
|---|---|---|---|---|
| 5,631,658 A | * | 5/1997 | Gudat et al. | 342/457 |
| 5,646,844 A | * | 7/1997 | Gudat et al. | 701/208 |
| 5,735,352 A | * | 4/1998 | Henderson et al. | 172/4.5 |
| 5,955,973 A | * | 9/1999 | Anderson | 340/988 |
| 6,088,644 A | * | 7/2000 | Brandt et al. | 701/50 |
| 6,434,462 B1 | * | 8/2002 | Bevly et al. | 701/50 |
| 6,880,643 B1 | * | 4/2005 | Zimmerman et al. | 172/4.5 |
| 7,425,952 B2 | * | 9/2008 | Rybacki et al. | 345/419 |
| 7,523,396 B2 | * | 4/2009 | Lewis et al. | 715/700 |
| 7,561,990 B2 | * | 7/2009 | Lewis et al. | 703/1 |

* cited by examiner

*Primary Examiner*—Robert E Pezzuto
(74) *Attorney, Agent, or Firm*—Lando & Anastasi, LLP (57) ABSTRACT

A method and system for creating a levelling surface for use in levelling a substantially uneven ground surface, optimised for a single plane, row cropping, or dryland cropping with no rows (a surface for row cropping will typically optimise the surface with a defined water flow direction and a surface for dryland cropping will typically optimise the surface to allow water flow in any direction). Terrain data is collected, at least one constraint corresponding to desired surface characteristics is inputted, and a data transformation engine is operated, wherein the data transformation engine optimises the terrain data for at least one terrain variable, generates an optimised terrain model that substantially complies with the at least one constraint, and outputs a levelling surface. The levelling surface may be outputted to a three-dimensional controller for land-levelling machinery which could then shift the soil from the existing terrain to match the levelling surface.

18 Claims, 9 Drawing Sheets

Existing Surface

| | |
|---|---|
| Field Name: | BMS-Moonie |
| Grid Data File: | cts\5505 OptiSurf\5505-3 Moonie Grid + 100 B.txt |
| Data Grid Spacing [m]: | 10 m |
| No. of Columns [across field]: | 134 |
| No. of Rows [down field]: | 99 |
| Block Orientaion to North: | 0 Degree (Bearing) |

Subarea To Analyse

| | | |
|---|---|---|
| Subarea Name: | 1A | |
| Subarea Coordinates | Upper left | Lower right |
| X | 1 | 134 |
| Y | 1 | 99 |

Proposed Surface

2

Surface Type

○ Single Plane

| | | |
|---|---|---|
| Use Plane of Best Fit: | TRUE | |
| Downslope: 1: | 10000 | 0.01% |
| Cross-slope: 1: | 10000 | 0.01% |

● Optimum Surface for Row Cropping

| | | |
|---|---|---|
| Minimum Downslope: 1: | 1600 | 0.06% |
| Maximum Downslope: 1: | 500 | 0.20% |
| Max. Downslope change: 1: | 2000 | 0.05% |
| Minimum Cross-slope: 1: | -250 | -0.40% |
| Maximum Cross-slope: 1: | 250 | 0.40% |
| Max. Cross-slope change: 1: | 1000 | 0.10% |

○ Optimum Surface for Dryland Cropping

| | | |
|---|---|---|
| Minimum slope: 1: | 2500 | 0.04% |
| Maximum slope: 1: | 200 | 0.50% |
| Maximum slope change: 1: | 500 | 0.20% |

Earthmoving Details

| | | |
|---|---|---|
| Cut to Export: | 0 | m3 |
| Fill to Import: | 0 | m3 |
| Cut/Fill Ratio: | 1.2 | |
| Earthmoving Rate: | $ 1.00 | /m3 |

Results Summary

| | | | |
|---|---|---|---|
| Calculation Date: | 21/04/2003 | | |
| Field Area: | 132.66 ha | | |
| | Proposed Max | Proposed Min | Best Plane |
| Downslope = 1: | 500 | 1600 | 1477 |
| Cross-slope = 1: | -250 | 0 | -1692 |
| Finished R.L. at corners: | 98.840 | 99.942 | |
| | 98.036 | 98.668 | |
| Volume of Cut: | 79137 m³ | | |
| Volume of Fill: | 65954 m³ | | |
| Earthmoving Cut/ha: | 597 m³/ha | | |
| Earthmoving Cost/ha | $ 597 /ha | | |
| Total Cost | $ 79,137 | | |

METHOD AND SYSTEM FOR OPTIMISING LAND LEVELLING DESIGNS

FIELD OF THE INVENTION

The present invention relates to land levelling designs, and in particular, a method and system for optimising land levelling designs.

BACKGROUND ART

[Mere reference to background art herein should not be construed as an admission that such art constitutes common general knowledge in relation to the invention.]

Land levelling is a process commonly used in the agricultural industry to improve various characteristics of a terrain. Typically, the existing terrain of an agricultural field or proposed agricultural field is surveyed to record the existing three dimensional shape of the land surface. Based on the surveyed terrain data, a desired terrain surface; is created which improves its characteristics for agricultural production e.g. drainage. The desired terrain surface is comprised of non-overlapping planar polygons that typically have side lengths of 100 meters or more. The outline of the polygons is manually defined by the designer and each polygon typically covers a significant portion of the desired terrain surface e.g. greater than 20%. The number of polygons is typically less than 10 per desired terrain surface because any more than this and the complexity of the traditional design process increases dramatically. This usual outcome of desired terrain surfaces comprised of 10 or so polygons can have an adverse affect, because as each polygon is planar and a lot of unnecessary earthmoving may be necessary to obtain the desired terrain surface.

Designing the desired terrain surface can be a complex task requiring the designer to consider many different variables in order to achieve the best terrain surface. Furthermore, the greater the detail required and the more polygons used greatly increase the complexity of the final design. Earthmoving equipment is then used to achieve the desired contour of the terrain.

The amount of earth moving required, namely, the amount of cut and fill which must be accomplished, and whether or not earth will need to be moved onto or removed from the terrain to accomplish the desired terrain surface are important factors to be considered when designing a desired terrain surface as they can greatly affect the cost of a land levelling project. Consequently, it is preferable to minimise the movement of earth required to achieve the desired terrain surface.

Some systems are proposed that optimise the terrain for rowed crops. However, optimisations for rowed crops require water drainage to occur in a single direction. This type of optimisation results in a lot of earthmoving being required to alter certain features of the terrain to allow the drainage to occur in the requisite direction.

It is an aim of this invention to provide a method and system for optimising land levelling designs which overcomes or ameliorates one or more of the disadvantages or problems described above, or which at least provides a useful alternative.

SUMMARY OF THE INVENTION

According to a first aspect of the present invention there is provided a method of creating a levelling surface for use in levelling a substantially uneven ground surface, the method comprising the steps of collecting terrain data, providing at least one constraint corresponding to desired surface characteristics, operating a data transformation engine wherein the data transformation engine optimises the terrain data for at least one terrain variable, generating an optimised terrain model that substantially complies with the at least one constraint, and outputting a levelling surface.

The levelling surface may be outputted to a three-dimensional controller for land-levelling machinery which could then shift the soil from the existing terrain to match the levelling surface.

The terrain data may be spatially referenced elevation data made up of a grid of cells, typically squares or a triangular irregular network. The grid may be defined in any configuration and be defined with cells of any shape. The spacing between data points may be defined by the designer, but generally would fall between the range of 1 meter to 100 meters, or more suitably between 5 meters to 20 meters.

Suitable constraints corresponding to desired surface characteristics may include maximum or minimum terrain gradient, maximum terrain gradient change, maximum or minimum elevation for at least one point or area, or indirect by-products of the terrain such as maximum velocity of rainfall runoff, or minimum infiltration depth of irrigation.

Preferably, the data transformation engine calculates elevation data for the terrain data that satisfies the design constraints while optimising for one or more terrain variables. The elevation data will also normally be associated with appropriate location data, such as for example location data provided through a positioning system such as GPS or similar, to define each cell in the grid at a particular location and elevation.

The one or more terrain variables may be any factor affected by the terrain. For example, the terrain variable may be the amount or volume of earth movement required and consequently the data transformation engine may then optimise the terrain data to minimise the amount of earth movement required with respect to achieving the desired terrain model.

Preferably, the type of surface to be output can be specified as at least one of a single plane, an optimum surface for row cropping, or an optimum surface for dryland cropping (no rows). For example, the optimum surface for row cropping will typically optimise the surface with a defined water flow direction for rain, irrigation, flow-on water, or the like. The optimum surface for dryland cropping will typically optimise the surface to allow water to flow in any direction (normally more than one direction from a given position in the area to be leveled) over the terrain as long as the water flows to the perimeter of the levelling surface. This can significantly decrease the required earthmoving in comparison to an optimum surface for row cropping which requires the water to flow in a defined direction (namely, parallel to the row direction) over the terrain.

According to a second aspect of the present invention there is provided a system for creating a levelling surface for use in levelling a substantially uneven ground surface, the system comprising initial terrain data, at least one constraint corresponding to desired surface characteristics, a data transformation engine wherein the data transformation engine optimises the initial terrain data for at least one terrain variable, an optimised terrain model generator, and at least one data output means adapted to output terrain data relating to a levelling surface.

According to a third aspect the invention resides in a system for creating a levelling surface for use in levelling a substantially uneven ground surface, the system comprising 1. at least one data input means for inputting of initial terrain data,
2. at least one data input means for inputting at least one constraint corresponding to desired levelling surface characteristics,
3. a data transformation engine wherein the data transformation engine optimises the initial terrain data for at least one terrain variable,
4. an optimised terrain model generator, and
5. at least one data output means adapted to output terrain data relating to a levelling surface generated by the optimised terrain model generator.

The system includes at least one data input means. Any one or more data input means can be used, and typically more than one will be used. Normally, the input data is collected as a part of a survey study of the pre-leveled ground surface. The surveying of the field is generally done by high accuracy GPS collecting data each second as it is driven over the field. The points where the data is collected is independent of the desired terrain surface's defined polygons. The input data is therefore generally dependant upon the form of the data collected during survey. Conventional survey systems typically collect data in a machine storable or readable form. Typically therefore, the usual form input means will be data input from storage media containing data or using keyboards for example. It is also envisaged that data input directly in machine readable form, or any other format could be used.

The input means will therefore typically be configured to input data in a variety of forms, such as using a keyboard, digital media reading through a digital media reader, disk drives and the like. Typically, the system operates on one or more computers and therefore the input meets will normally be one or more input means which can be used to import data into a computer whether provided as part of the computer or attachable thereto.

The system also typically includes at least one data storage means. The input data entering the system will generally be stored at least temporarily prior to transformation and the output data which is to be output from the system will typically be stored at least temporarily within the system after the transformation. One or more removable or loadable data storage means may be associated with the system particularly for transferring the output data from the system to a file or other mechanism for remote use, such as by remote land levelling machinery.

Alternatively, storage means may not be used for storing the output data but instead and output data broadcast system may be implemented to upload or send output data to a remote location over a wireless connection.

Storage means using according to the present invention will typically include one or more digital storage media such as a hard drive, removable data storage media for example storage disks or machine readable compact discs or flash drives for example.

The system also includes a data transformation engine. Typically the data transformation engine will be embodied in one or more processors provided on one or more computers. The data transformation engine according to a preferred embodiment may be or include an optimised terrain model generator. Typically, the function of the data transformation engine is to receive input data, apply the desired surface characteristics defined by the user and to optimise the input data according to the characteristics in order to produce output data. This is typically an iterative process. According to the process, a perfect solution may not be found and a "best fit solution" approach may be used.

The system also includes at least one data output means. In its simplest form, the data output means will typically include a screen for visual display for example. The system will typically output data in the most convenient form for use. There will typically be a variety of options available and normally more than one data output means will be used. For example, an operator may wish to view a surface map and therefore a visual display output means is used. The user may then also wish to output the data in a machine readable, storable or usable form, and a second output means will normally be used for this purpose.

Typically, the output means will output the data to a file in machine readable or usable form which an operator's equipment (either a computer for example or the levelling machinery) can read and manipulate to form a visual display or for use by the levelling machinery in levelling of the ground.

The visual output means may display information such that both the location and the amount of material to be cut or filled is displayed. A levelling surface map may be a part of the output data display as may a separate "cut and fill" map showing the location of movement and the amount of movement to be actioned during the levelling.

As stated above, the terrain data (both input and output) may be spatially referenced elevation data made up of a grid of cells, typically squares or a triangular irregular network. The operator may have the ability to define the number of cells in the grid and the size of the cells when entering the input data or the desired levelling surface characteristics. The operator may further have the ability to designate only a portion of the input data to optimise and leave the remainder unaffected.

The operator may typically have a choice of whether to optimise the surface according to the traditional single plane of best fit or alternatively to use a surface, preferably a 3-dimensional surface, which can vary infinitely in shape at the resolution of the grid specified by the user to optimise the characteristics of adjacent cells. The operator may input minimum down-slope, maximum down-slope an/or maximum down-slope change and/or minimum cross-slope, maximum cross-slope an/or maximum cross-slope change as a part of the characteristics. This alternative ability to use a surface, preferably a 3-dimensional surface, which can vary infinitely in shape at the resolution of the grid specified by the user preferably differentiates the present invention from the prior art systems which only allow the one or more planes of best fit to be used.

The operator may also be able to impose limits on the maximum depth of soil or earth that maybe cut or filled, to or from any cell.

A results summary as well as visual results display and/or digital results may be produced for the operator. This results summary may summarise the important information in relation to the proposed levelling surface.

For the purposes of the present invention, the application of the method and system has been described as directed to two main applications namely a "row cropping" application in which an optimised field levelling profile is created such that water will drain from the field substantially in a single direction only and a "dryland cropping" or "no row" application in which an optimised field levelling profile is created such that water will drain from the field substantially in any direction, which may also be referred to as a multi-directional optimised field levelling profile.

In order that the invention may be more readily understood and put into practice, one or more embodiments thereof will now be described, by way of example only, with reference to the accompanying drawings.

DESCRIPTION OF PREFERRED EMBODIMENTS

Figure 1:
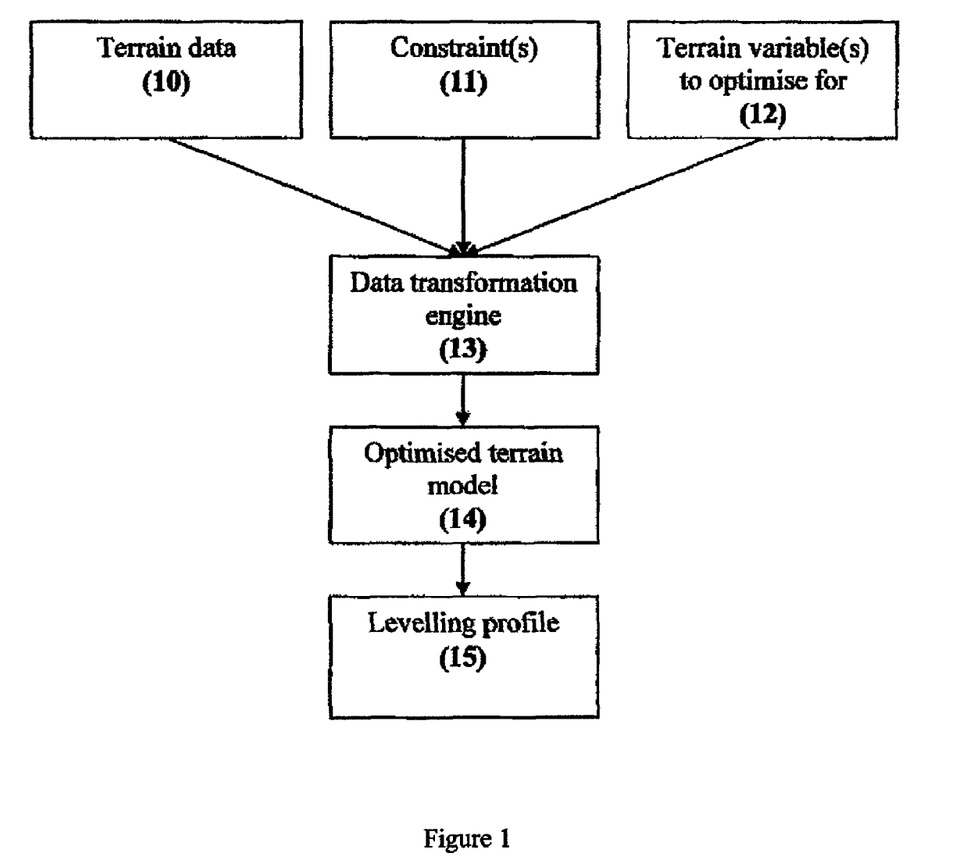
FIG. 1 is a flow chart of the steps involved to create a levelling surface according to an embodiment of the present invention.

FIG. 1 shows a flow chart of the primary steps involved in the present invention. Terrain data 10 relating to the elevation of a terrain area at different co-ordinates is gathered. For the example shown in FIGS. 2 to 5, an example set of terrain data was collected and represented as three-dimensional Cartesian co-ordinates with 10 meter intervals. It should be noted that the terrain elevation data may take other forms (e.g. a triangular irregular network) and may be collected and represented using any suitable technique.

The terrain data 10 is inputted to a data transformation engine 13 with constraints 11 and so at least one terrain variable for optimising 12. The constraints 11 may include maximum or minimum terrain gradient, maximum terrain gradient change, maximum or minimum elevation for at least one point or area, maximum velocity of rainfall runoff, or minimum infiltration depth of irrigation. The constraints 11 are usually selected to give favourable characteristics to terrain for certain uses. In summary, the data transformation engine 13 optimises the terrain data 10 to minimise or maximise the terrain variable 12 while satisfying the constraints 11. The data transformation engine 13 then generates an optimised terrain model 14 and subsequently outputs a levelling surface 15.

The levelling surface 15 can be outputted in many different forms. The levelling surface 15 can be outputted to a three-dimensional controller for land-levelling machinery. The land-levelling machinery could then use the levelling surface 15 to create the optimised terrain model 14 from the existing terrain.

Figure 2:
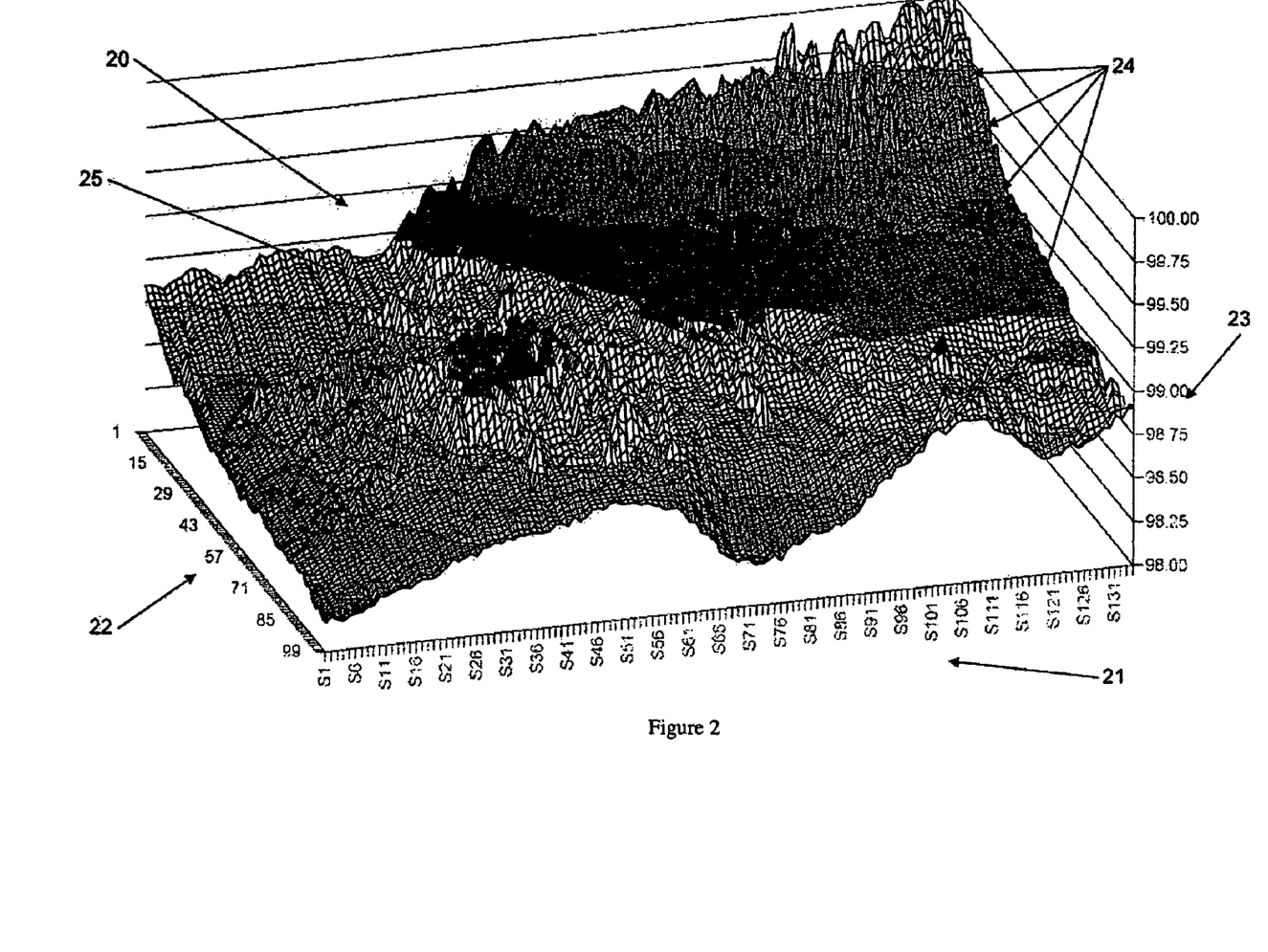
FIG. 2 is a perspective view of a terrain map mesh generated from example terrain data.

FIG. 2 shows a perspective view of a three-dimensional terrain map mesh 20 generated from an example set of terrain data. The terrain map mesh 20 has three dimensional co-ordinates x 21, y 22 and z 23. Each square on the terrain map mesh 20 represents a 10 meter by 10 meter area in the x 21 and y 22 axes respectively. The elevation of the terrain on the z axis 23 is represented in meters. Contour lines 24 are provided to highlight different elevation ranges for the terrain map mesh 20.

The example terrain data 10 shown in FIG. 2 was inputted to the data transformation engine 13 with certain constraints 11 and a single terrain variable 12 to optimise for. The constraints 11 used in the example shown in FIGS. 2 to 5 were chosen to provide a favourable surface for row cropping (as shown in FIG. 6). Specifically, the constraints were: minimum down-slope of 0.06%, maximum down-slope of 0.20%, maximum down-slope change of 0.05%, minimum cross-slope of −0.40%, maximum cross-slope of 0.40%, and maximum cross-slope change or 0.10%.

The terrain variable 12 that was optimised for in the example shown in FIGS. 2 to 5 was the amount of earth moving required. Consequently, the data transformation engine optimised the terrain data 10 to minimise the earth-moving required (terrain variable 12) while satisfying the constraints 11. The data transformation engine 13 then generated an optimised terrain model 14 and subsequently outputted a levelling surface 15.

It is an advantage of the present invention that the data transformation engine 13 can minimise the amount of earth-moving required for a levelling surface 15 as it reduces the cost to implement the optimised terrain model 14. Furthermore, the data transformation engine 13 allows for optimised terrain models 14 that require less topsoil removal. This can minimise crop yield reductions associated with land-levelling operations, especially in soils with limited topsoil depth.

Figure 3:
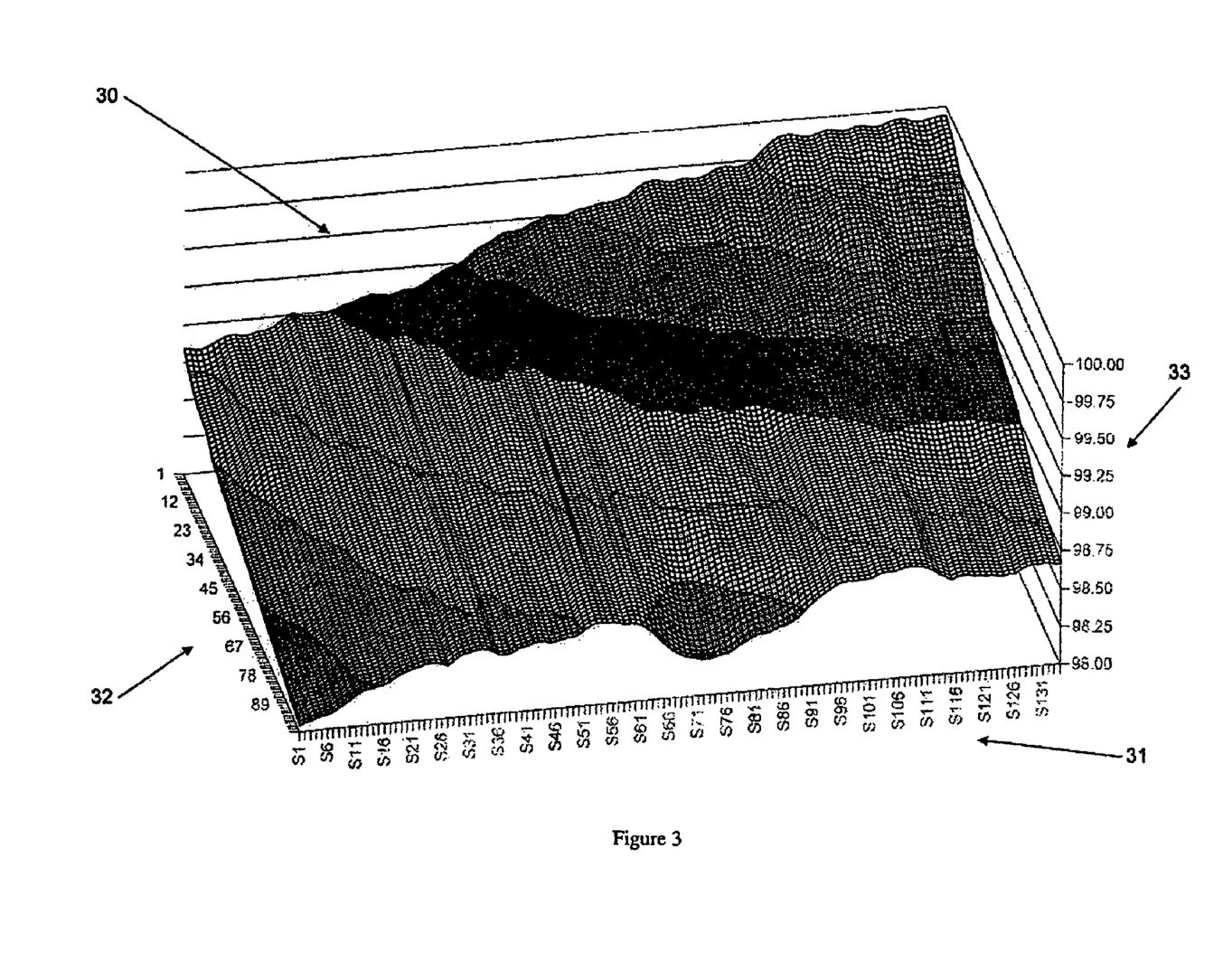
FIG. 3 is a perspective view of a levelling surface for the terrain shown in FIG. 2 optimised for row cropping.
Figure 4:
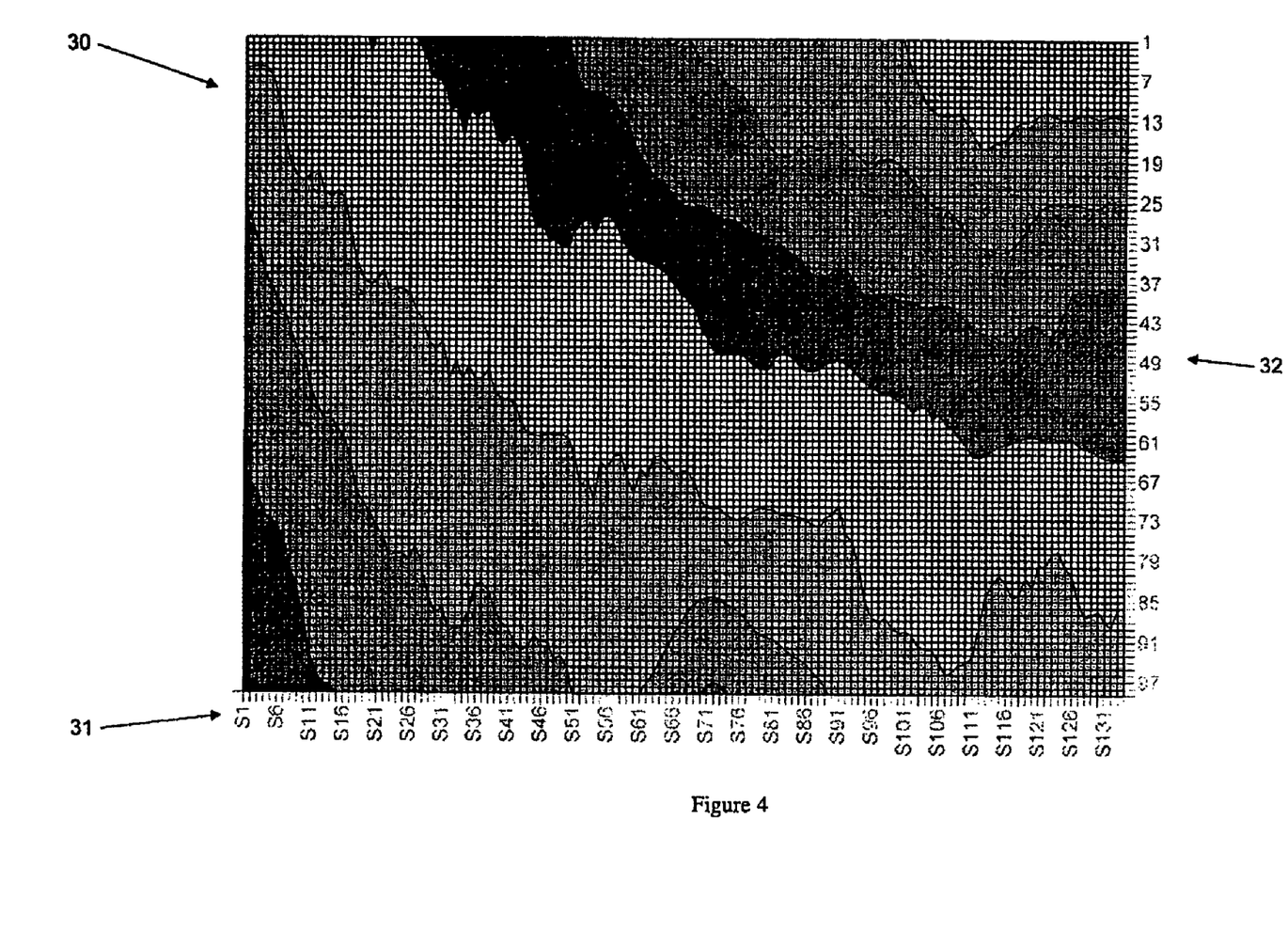
FIG. 4 is an plan view of the levelling surface shown in FIG. 3 optimised for row cropping.

The levelling surface 15 may directly resemble the optimised terrain model 14, a form of which is shown in FIG. 3. The levelling surface 15 in FIG. 3 is shown as a perspective view of a three-dimensional optimised terrain model 30. Similar to the terrain map mesh 20 shown in FIG. 2, the optimised terrain model 30 has three-dimensional co-ordinates x 31, y 32 and z 33 and each square on the optimised terrain model 30 represents the same 10 meter by 10 meter area of terrain shown in FIG. 2. A plan view of the optimised terrain model 30 is shown in FIG. 4.

Comparing the terrain map mesh 20 with the optimised terrain model 30, it can be seen that the data transformation engine 13 has appreciably altered the terrain data 10. The most notable feature is that the optimised terrain model 30 is significantly smoother than the example terrain data 10 shown in the terrain map mesh 20 of FIG. 2. For example, to create a favourable surface for row cropping by satisfying the constraints 11, a small hill 25 in FIG. 2 has been smoothed out and is not visible in the optimised terrain model 30.

Figure 5:
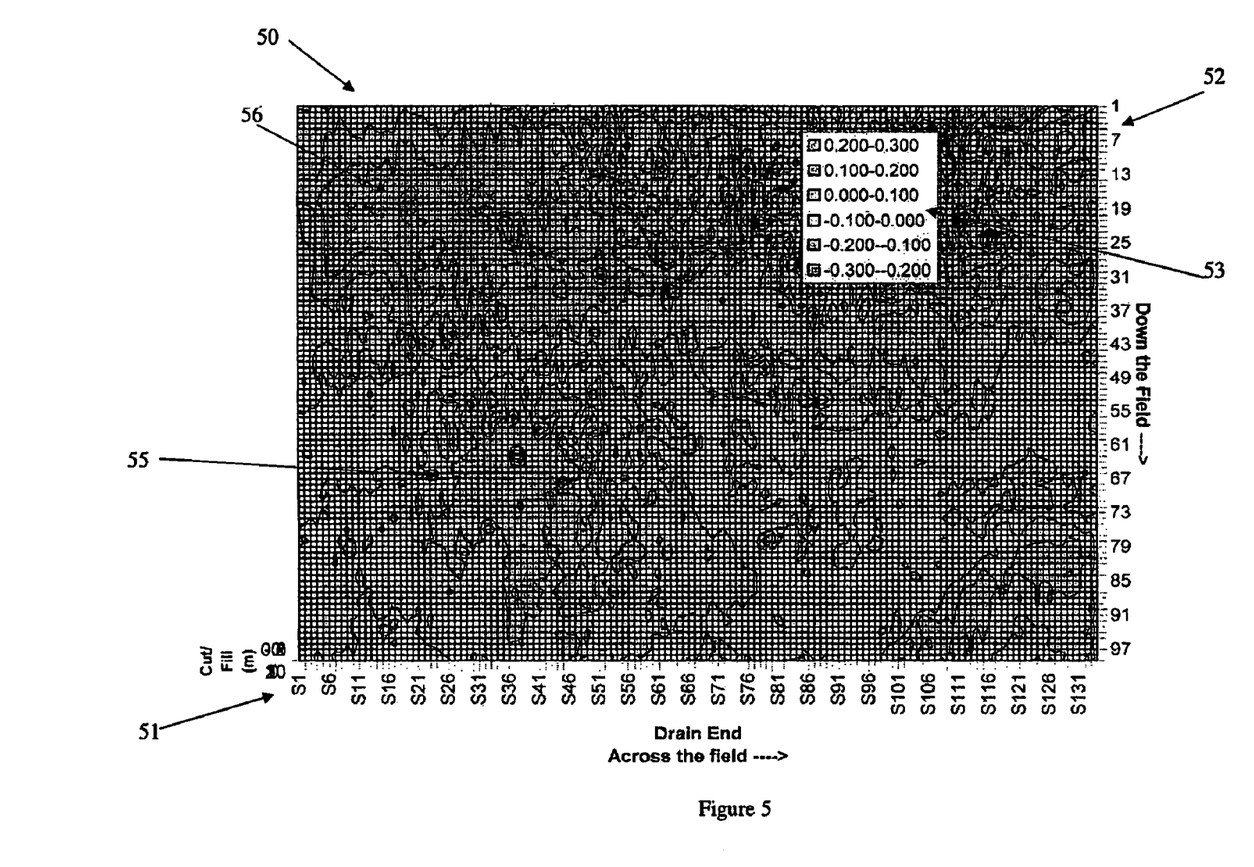
FIG. 5 is an alternate levelling surface for the terrain shown in FIG. 2 optimised for row cropping.
Figure 6:
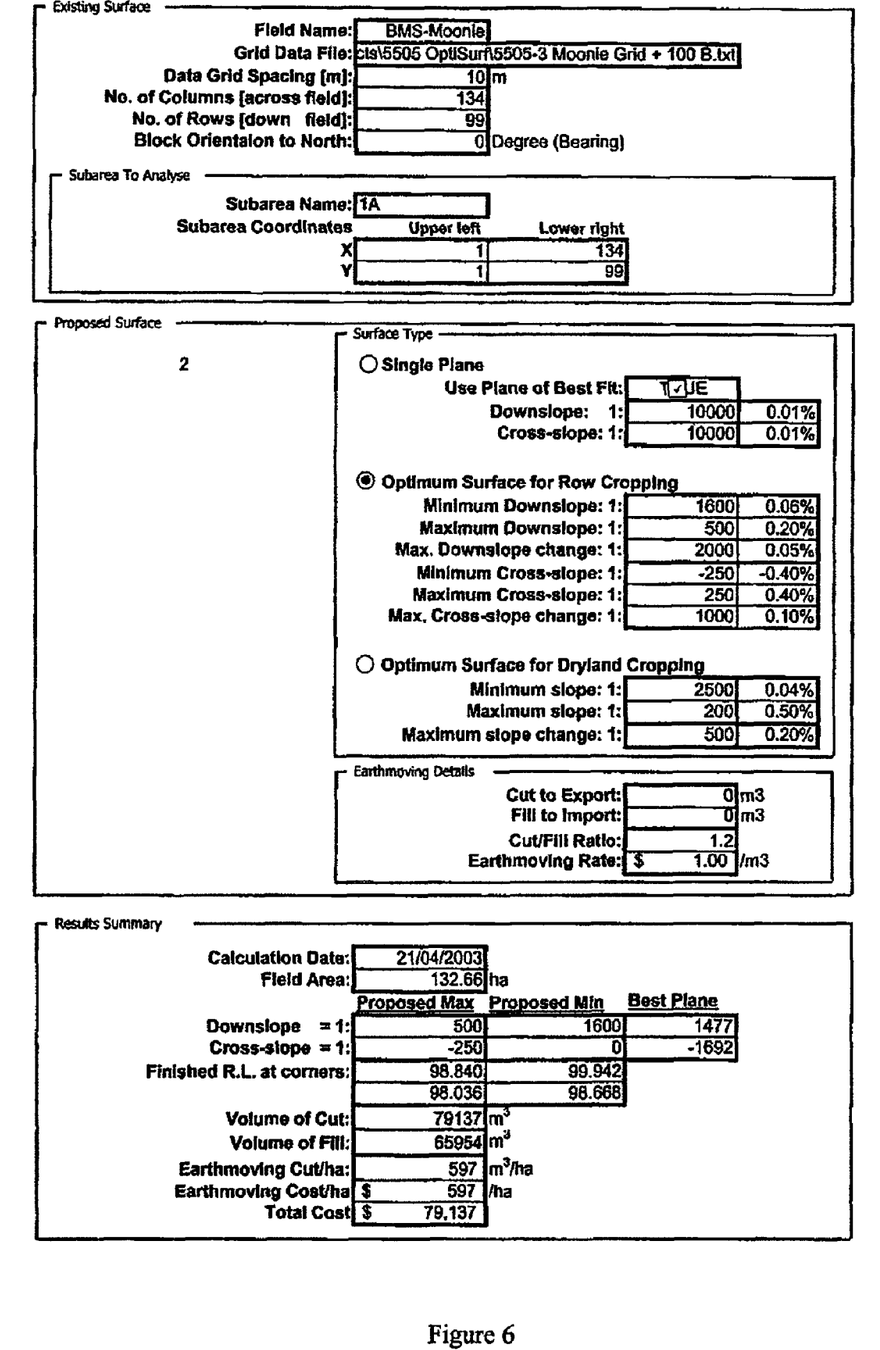
FIG. 6 is a tabular representation of a main menu for a system according to a preferred embodiment of the present invention showing details of the existing surface, the proposed surface including desired levelling surface characteristics and a results summary.

An alternate levelling surface output 15 is a cut/fill map 50 as shown in FIG. 5. The cut/fill map 50 is shown in FIG. 5 as a plan view and has two-dimensional axes: x 51 and y 52. The cut/fill map 50 is commonly used in the industry and clearly shows which areas need to be lowered (cut) and which areas need to be raised (filled). A legend 53 is shown to indicate the amount of terrain that needs to be cut or filled to achieve the optimised terrain model 14 in this example. The small hill 25 in FIG. 2 is clearly represented by the dark area 55 on the cut/fill map. This represents an area that requires lowering to achieve the optimised terrain model 14. On the other hand, the patterned area 56 on the cut/fill map 50 indicates are area on the terrain that requires raising to achieve the optimised terrain model 14.

Figure 7:
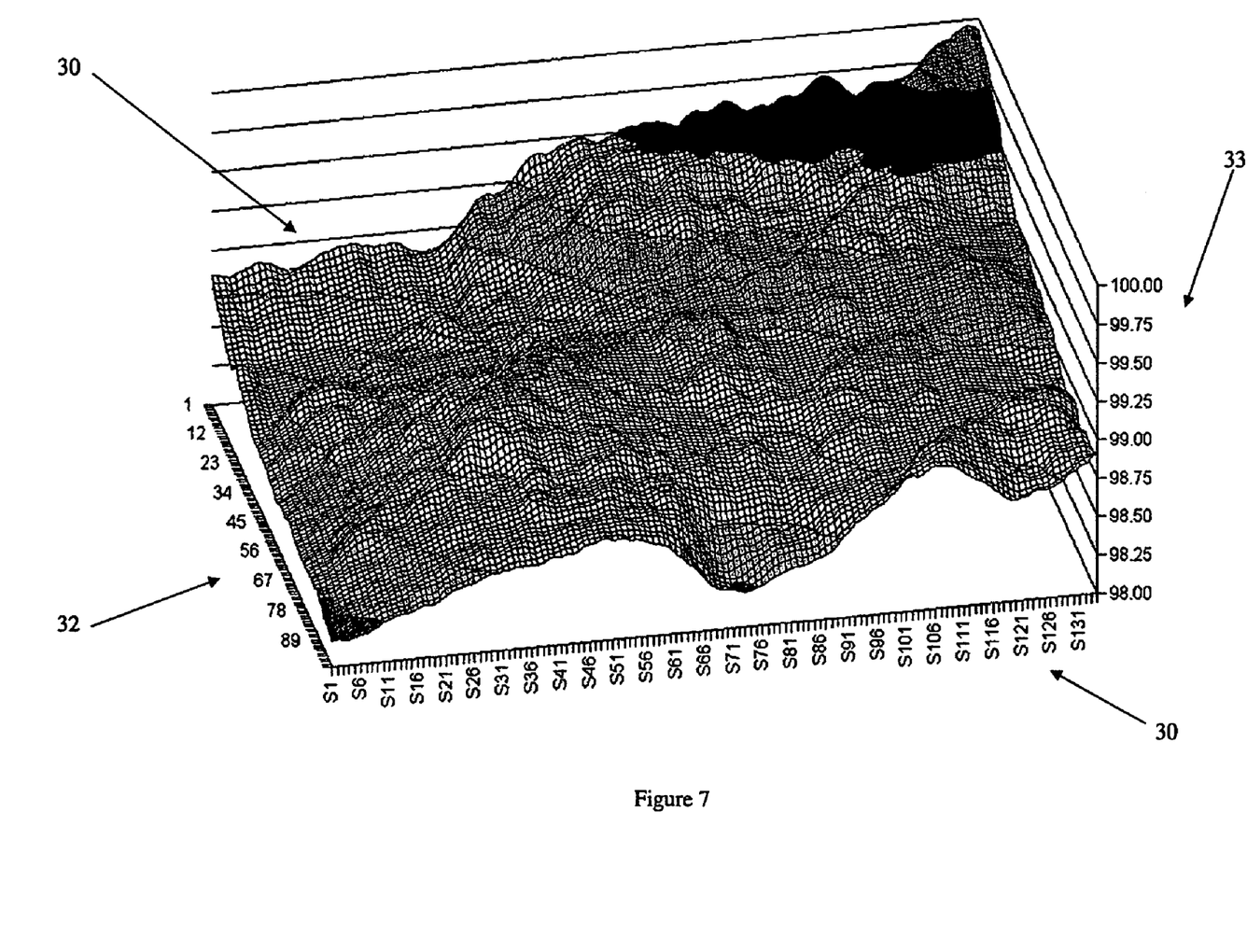
FIG. 7 is a perspective view of a levelling surface for the terrain shown in FIG. 2 optimised for dryland cropping (no rows).
Figure 8:
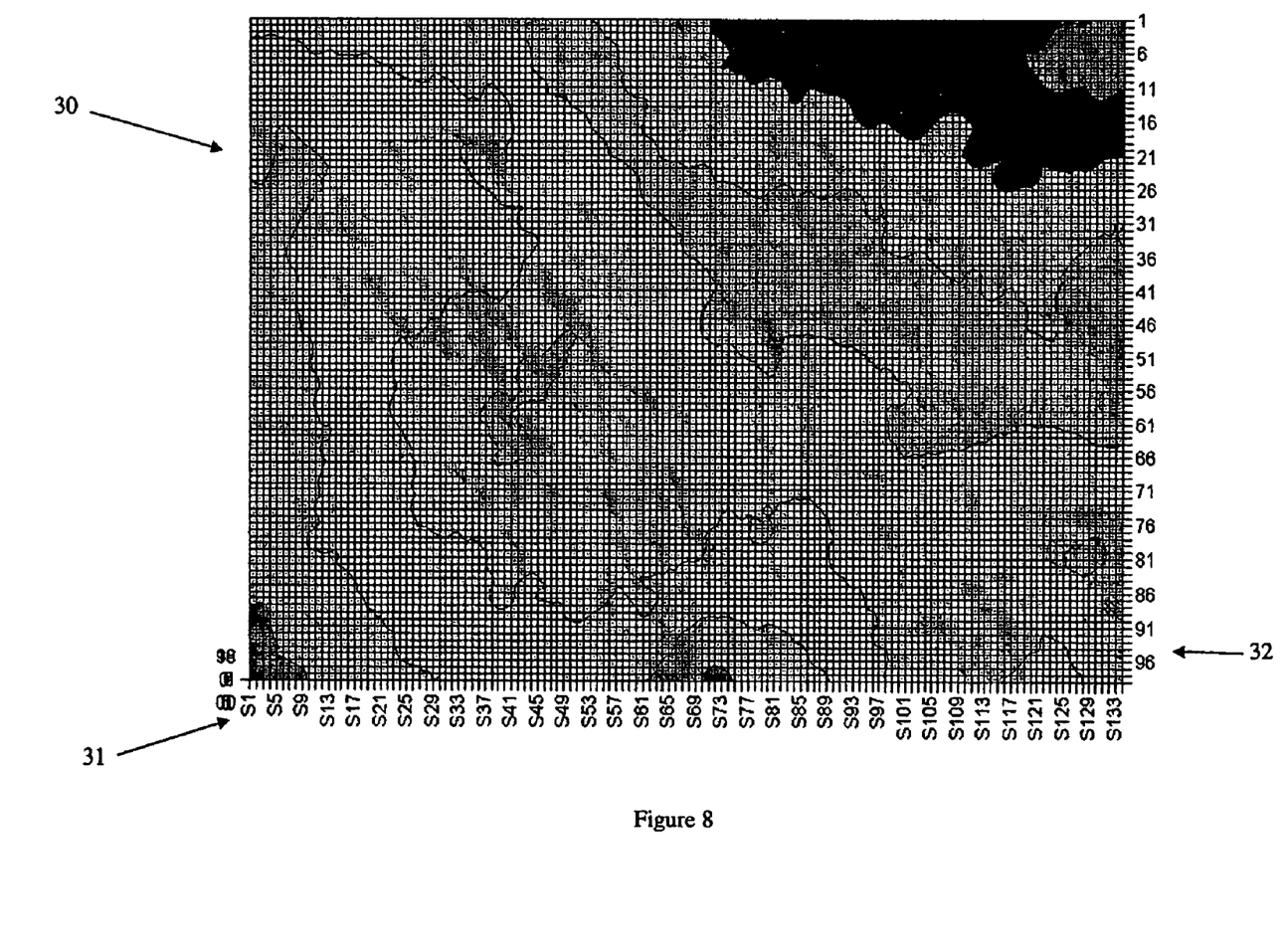
FIG. 8 is an elevation view of the levelling surface shown in FIG. 7 optimised for dryland cropping (no rows).
Figure 9:
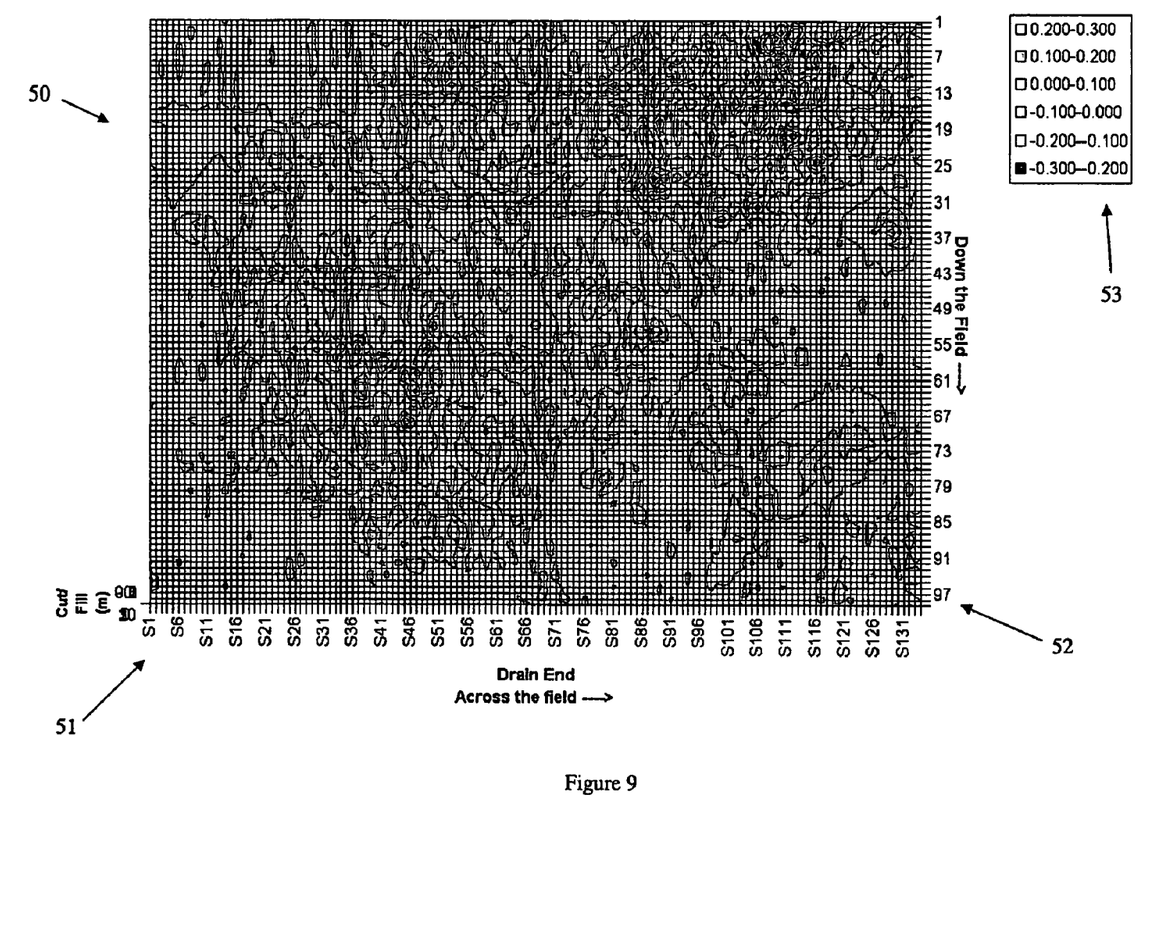
FIG. 9 is an alternate levelling surface for the terrain shown in FIG. 2 optimised for dryland cropping (no rows).

The example terrain data 10 shown in FIG. 2 was also inputted to the data transformation engine 13 chosen to provide a favourable surface for dryland cropping as shown in FIGS. 7 to 9. Specifically, the constraints were: minimum slope of 0.04%, maximum slope of 0.50%, and a maximum slope change of 0.2%.

As in the previous example (FIGS. 3 to 5) the levelling surface 15 may directly resemble the optimised terrain model 14, in this case shown in FIG. 7. The levelling surface 15 in FIG. 7 is shown as a perspective view of a three-dimensional optimised terrain model 30. Similar to the terrain map mesh 20 shown in FIG. 2, the optimised terrain model 30 has three-dimensional co-ordinates x 31, y 32 and z 33 and each square on the optimised terrain model 30 represents the same 10 meter by 10 meter area of terrain shown in FIG. 2. A plan view of the optimised terrain model 30 is shown in FIG. 8.

Comparing the terrain map mesh 20 with the optimised terrain model 30, it can be seen that the data transformation engine 13 has generally smoothed the terrain data 10. However, the optimised terrain model is not as smooth as that shown in FIG. 3 as it was optimised for dryland cropping (instead of row cropping) and therefore no cross slope parameters are defined and any point in the field can drain in any direction, as long as the water flows to the edge of the field. Optimising the terrain for dryland cropping can dramatically decrease the required earthmoving in comparison to row cropping and is therefore a highly desirable transformation. As an example of this, the small hill 25 in FIG. 2 that was completely smoothed out in FIG. 3 is still generally present in the optimised terrain model 30 in FIG. 7, requiring considerably less earthmoving than the terrain in FIG. 3 would require.

Similarly to FIG. 5, an alternate levelling surface output in the form of a cut/fill map 50 is shown in FIG. 9 for the dryland cropping terrain The cut/fill map 50 is shown in FIG. 9 as a plan view and has two-dimensional axes: x 51 and y 52. The cut/fill map 50 is commonly used in the industry and clearly shows which areas need to be lowered (cut) and which areas need to be raised (filled). A legend 53 is shown to indicate the amount of terrain that needs to be cut or filled to achieve the optimised terrain model 14 in this example. As the dryland optimised terrain requires less earth moving, the quantities of earth required to be cut/fill are significantly less than were required for the cut/fill map shown in FIG. 5.

The levelling surface 15 can be outputted to a three-dimensional controller in land-levelling machinery to achieve the desired optimised terrain model 14. It shall be appreciated that the present invention can output levelling surfaces that can minimise crop yield reductions, earth moving required, the costs to implement, etc. Furthermore, because there are generally less designer inputs and less trial and error than previous methods/systems, the present invention may allow a terrain designer with less skill than was previously required to produce an improved levelling surface in less time than was previously required.

It is to be understood that the terminology employed above is for the purpose of description and should not be regarded as limiting.

The foregoing embodiments are intended to be illustrative of the invention, without limiting the scope thereof. The invention is capable of being practised with various modifications and additions as will readily occur to those skilled in the art.

Throughout this specification, including the claims, where the context permits, the term "comprise" and variants thereof such as "comprises" or "comprising" are to be interpreted as including the stated integer or integers without necessarily excluding any other integers.

The invention claimed is:

1. A method of creating a levelling surface for use in levelling a substantially uneven ground surface, the method comprising the steps of collecting terrain data, inputting terrain data into a computer, inputting at least one constraint corresponding to desired surface characteristics into the computer, operating a data transformation engine on a processor of the computer, wherein the data transformation engine optimises the terrain data for at least one terrain variable and generates an optimised terrain model that substantially complies with the at least one constraint, and outputting data relating to a levelling surface based on the optimised terrain model in a machine readable or usable form.

2. The method of creating a levelling surface of claim 1, wherein the data transformation engine optimises the terrain data for at least a single plane, for row cropping, or for dryland cropping without rows.

3. The method of creating a levelling surface of claim 2, wherein the data transformation engine optimises the terrain data for dryland cropping without rows by transforming the terrain to allow water to flow in any direction over the terrain to the perimeter of the levelling surface.

4. The method of creating a levelling surface of claim 1, wherein the levelling surface is outputted to a controller for land-levelling machinery.

5. The method of creating a levelling surface of claim 1, wherein the terrain data is spatially referenced elevation data.

6. The method of creating a levelling surface of claim 5, wherein the spatially referenced elevation data is a grid of squares cells.

7. The method of creating a levelling surface of claim 5, wherein the spatially referenced elevation data is a triangular irregular network.

8. The method of creating a levelling surface of claim 1, wherein the terrain data is sampled at intervals between 1 meter to 100 meters.

9. The method of creating a levelling surface of claim 1, wherein the at least one terrain variable includes the amount of earth moving required.

10. A system for creating a levelling surface for use in levelling a substantially uneven ground surface, the system comprising terrain data, at least one constraint corresponding to desired surface characteristics, a computer having a data transformation engine configured to accept terrain data and the at least one constraint, wherein the data transformation engine optimises the terrain data for at least one terrain variable, and an optimised terrain model generator configured to generate an optimised terrain model that substantially complies with the at least one constraint, and at least one data output means adapted to output data relating to a levelling surface based on the optimized terrain model in a machine readable or usable form.

11. The system for creating a levelling surface of claim 10, wherein the data transformation engine optimises the terrain data for at least a single plane, for row cropping, or for dryland cropping without rows.

12. The system for creating a levelling surface of claim 11, wherein the data transformation engine optimises the terrain data for dryland cropping without rows by transforming the terrain to allow water to flow in any direction over the terrain to the perimeter of the levelling surface.

13. The system for creating a levelling surface of claim 10, wherein the levelling surface is outputted to a controller for land-levelling machinery.

14. The system for creating a levelling surface of claim 10, wherein the terrain data is spatially referenced elevation data.

15. The system for creating a levelling surface of claim 14, wherein the spatially referenced elevation data is a grid of squares cells.

16. The system for creating a levelling surface of claim 14, wherein the spatially referenced elevation data is a triangular irregular network.

17. The system for creating a levelling surface of claim 10, wherein the terrain data is sampled at intervals between 1 meter to 100 meters.

18. The system for creating a levelling surface of claim 10, wherein the at least one terrain variable includes the amount of earth moving required.

* * * * *